United States Patent
Jang et al.

(10) Patent No.: US 6,980,223 B2
(45) Date of Patent: Dec. 27, 2005

(54) METHOD AND APPARATUS FOR CONVERTING A COLOR SPACE OF OSD

(75) Inventors: Min Seok Jang, Seoul (KR); Kyu Jae Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 10/322,231

(22) Filed: Dec. 17, 2002

(65) Prior Publication Data

US 2003/0115613 A1    Jun. 19, 2003

(30) Foreign Application Priority Data

Dec. 19, 2001 (KR) ............... 2001-81271

(51) Int. Cl.⁷ ............................... G09G 5/02
(52) U.S. Cl. ........................................ 345/604
(58) Field of Search ................... 345/600, 601, 345/602, 603, 604, 582, 586, 564, 565, 566, 345/572

(56) References Cited

U.S. PATENT DOCUMENTS

| | | | |
|---|---|---|---|
| 5,808,630 A * | 9/1998 | Pannell | 345/546 |
| 5,872,556 A * | 2/1999 | Rackley et al. | 345/603 |
| 6,069,972 A * | 5/2000 | Durg et al. | 382/167 |
| 6,356,276 B1 * | 3/2002 | Acharya | 345/600 |
| 6,439,722 B1 * | 8/2002 | Seegers et al. | 351/243 |
| 6,532,024 B1 * | 3/2003 | Mauger et al. | 345/716 |
| 2002/0105660 A1 * | 8/2002 | Haikin | 358/1.9 |

FOREIGN PATENT DOCUMENTS

KR    1002442270000    11/1999    ......... H04N 7/015

* cited by examiner

Primary Examiner—Matthew C. Bella
Assistant Examiner—Aaron M Richter
(74) Attorney, Agent, or Firm—Hong, Degerman, Kang & Schmadeka

(57) ABSTRACT

Disclosed is a method and apparatus in which the image of a received data content is converted to accord with the color space of an OSD to be displayed on a screen upon reproducing the colors of a received digital broadcast data image. The apparatus includes: a browser for analyzing information on received video and data content and displaying an image obtained from the analyzed information; a selective switch part for switching modes of the color space of an output OSD according to a selection control by a user; a converter engine for checking the mode of the color space selected by the selective switch part, setting a property of the color space of the output OSD according to the checked mode, and converting a bitmap image of the data content to accord with the set color space; and a display part for displaying the set and converted color space on the OSD.

16 Claims, 2 Drawing Sheets

METHOD AND APPARATUS FOR CONVERTING A COLOR SPACE OF OSD

CROSS-REFERENCE TO RELATED APPLICATIONS

Pursuant to 35 U.S.C. § 119(a), this application claims the benefit of earlier filing date and right of priority to the Korean Application No. 2001-81271, filed on Dec. 19, 2001, the content of which is hereby incorporated by reference herein in its entirety.

BACKGROUND OF THE INVENTION

1. Field of the Invention

The present invention relates to a method and apparatus for converting a color space of an OSD (On Screen Display), and more particularly, to a method and apparatus in which the image of a received data broadcasting contents are converted to accord with the color space of an OSD to be displayed.

2. Description of the Related Art

An output image format of a digital broadcasting receiver can be represented by using various color spaces. In other words, the output image can be reproduced with intended colors by selecting a video to be displayed and the color space which defines respective components of colors of the OSD.

Generally, the color space of an output image of the digital broadcast receiver is realized by the color coordinate system such as RGB (R: red, G: green, B: blue) method, YCbCr (Y: brightness, Cb, Cr: chrominance) method or the like. The RGB method defines the color on the basis of color components, and the YCbCr method defines the color on the basis of luminance and chrominance representing the brightness of a color.

However, since the two color spaces as above are different color coordinate system, colors of an image realized on a screen may be viewed abnormal if the color coordinate system for an input image and the color coordinate system for an output image are different from each other. Therefore, if the two color coordinate system are different, it is necessary that the color coordinate system for an input image should be converted to accord with the color coordinate system for an output image.

In the case of a video, the above conversion can be made through a hardware at a chip level. In contrast, in the case of OSD, the color space can be selected. However, the hardware only sets the color space of an image on OSD, but it does not convert the bitmap image on OSD automatically. In other words, in the case of OSD, the conversion can be possible according to the kinds of chips, but sometimes impossible.

Generally, contents for the digital data broadcasting are made to accord with the RGB color space, and therefore, a software for a browser for processing the contents is prepared under an assumption that the color space of the OSD is typically RGB. However, if the color space of the output image is set to be YCbCr, the RGB color space should be converted into the YCbCr color space.

Here, in the case of an OSD of 8 bpp (bit per pixel) or less, the property of an OSD color space is set by an indirect color display method using a palette. Here, the color space of an output image can be simply converted only by changing a palette in which color values are preset.

However, in the case of a direct color process of 16 bpp or more, since a bitmap image on an OSD represents color information, the bitmap image, itself, as well as the property of the OSD color space should be converted. That is, if the color coordinate system of an output image OSD is set to be a YCbCr color space of 16 bpp, and the color coordinate system of an input image is set to be an RGB color space of 16 bpp, an input RGB bitmap is recognized to be a YCbCr bitmap so that original colors are not realized fully enough, and the output image is realized as an image with different colors.

SUMMARY OF THE INVENTION

Accordingly, the present invention is directed to a method and apparatus for converting a color space of an OSD that substantially obviates one or more problems due to limitations and disadvantages of the related art.

An object of the present invention is to provide an apparatus and method for converting a color space of an OSD in which received data broadcasting contents are converted to accord with the color space of an OSD to be outputted on a screen to reproduce original colors of the data broadcasting contents upon reproducing the colors of a digital broadcast image on a screen.

Another object of the present invention is to provide a display device in which colors are smoothly displayed by performing a conversion process of a bitmap level for a data content image to accord with the color space of an output image in a process displaying the image of the data content on an OSD of 16 bpp or more, which is used for the display of digital broadcasting content.

A further another object of the present invention is to provide a software method in which images of data broadcasting contents are converted to accord with an output color space without a separate hardware support when an OSD of 16 bpp or more is used for the display of data broadcast contents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for converting a color space of an OSD. The apparatus includes: a browser for analyzing information on received video and data content and displaying an image obtained from the analyzed information; a selective switch part for switching modes of the color space of an output OSD according to a selection control by a user; a converter engine for checking the mode of the color space selected by the selective switch part, setting a property of the color space of the output OSD according to the checked mode, and converting a bitmap image of the data content to accord with the set color space; and a display part for displaying the set and converted color space on the OSD.

In another aspect of the present invention, there is provided a method for converting a color space of an OSD. The method includes the steps of: a) selecting a mode of the color space outputted on the OSD; b) setting a property of the color space of the OSD and a property of a color space of a video according to the selected mode of the color space; c) determining the set mode of the color space and deciding whether or not to perform a color space conversion at a bitmap level according to the set mode; d) converting a bitmap image of an input data content into a bitmap image of the color space of the property-set OSD; and e) displaying the converted bitmap image on the OSD.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
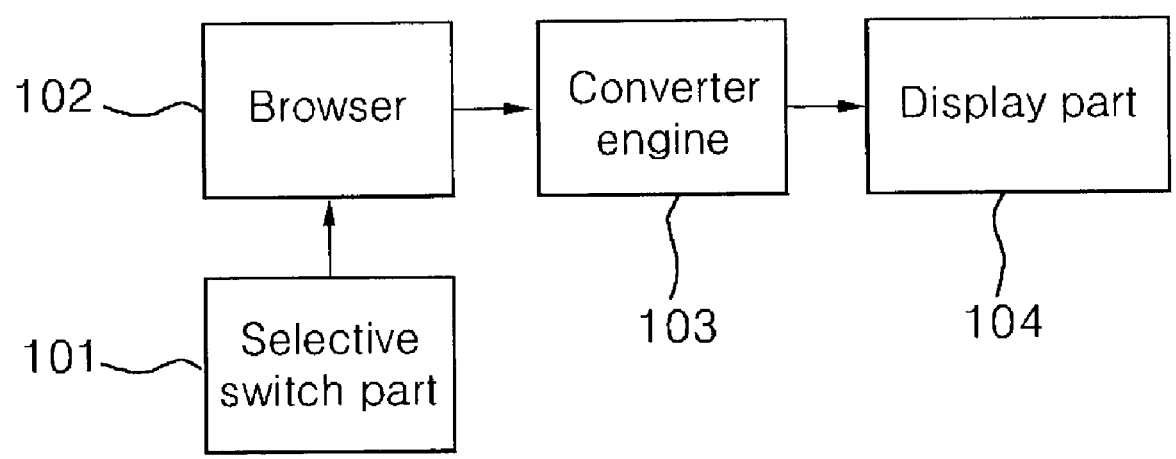
FIG. 1 is a schematic block diagram of an apparatus for converting a color space of an OSD according to the present invention.

FIG. 1 is a schematic block diagram of an apparatus for converting a color space of an OSD according to the present invention.

As shown in FIG. 1, an apparatus for converting a color space according to the present invention include: a browser 102 for analyzing information on received video and data content and displaying an image obtained from the analyzed information; a selective switch part 101 for switching modes of the color space of an output OSD according to a selection control by a user; a converter engine 103 for checking the mode of the color space selected by the selective switch part 101, setting a property of the color space of the output OSD according to the checked mode, and converting a bitmap image of the data content to accord with the set color space; and a display part 104 for displaying the set and converted color space on the OSD.

The operation of the apparatus for converting a color space of OSD of the present invention is described hereinafter in more detail.

First, a user selects modes of a color space of an output OSD by the selective switch part 101. The browser 102 checks which mode is the selective switch part for selecting the modes of the color space of the output image placed in. According to the checking result, the browser 102 sets the properties of color spaces for video and OSD can be determined accordingly (VDP, OSD set-up). In the case of an OSD with 8 bpp, a palette is replaced and reset according to the set property of the color space.

If the color space of an output OSD is a YCbCr color space, the converter engine 103 converts an output image of the data content with an RGB color space into a bitmap image of the YCbCr color space and outputs the converted bitmap image on an OSD of 16 bpp.

In contrast, if the color space of an output video is an RGB color space, the image of the data content with the RGB color space can be outputted without a separate color space conversion process. However, if the color space of an output video is a YCbCr (YPbPr) color space, the image of the data content is converted into a bitmap image for a YCbCr color space at a bitmap level, and then, displayed on the display part 104.

As described above, the conversion process of the color space at a bitmap level according to the present invention is modulized, and is applied to an OSD device driver so that it operates in a final output terminal into an OSD device.

However, the color space conversion step can be performed in a decoding step of analyzing received data content in the browser in advance, or can be applied to an associated graphic library leveled lower than the browser to operate when producing the decoded data content as an image.

Figure 2:
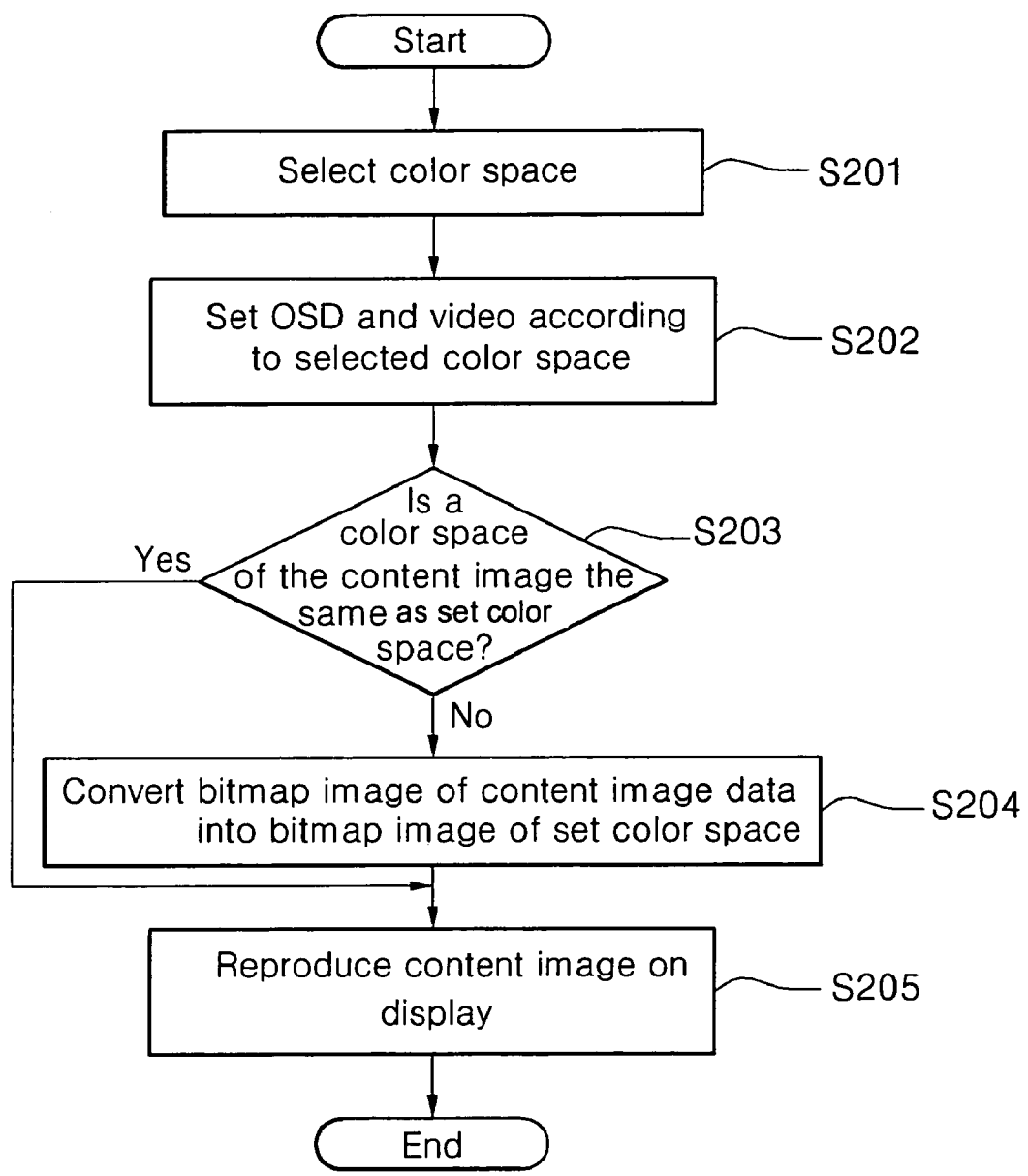
FIG. 2 is a flow chart of a method for converting a color space of an OSD according to the present invention.

FIG. 2 is a flow chart of a method for converting a color space of an OSD according to the present invention.

As illustrated in FIG. 2, a user selects the mode of a color space to be outputted on an OSD. Here, the selected color space (RGB or YCbCr) is a color space for an output video and an OSD of a system (S201).

The modes of the color space are selected by using a color space mode selective switch.

Then, the mode selection of the color space is checked, and the property of the output color space is set (S202).

In the step of S202, the output video and OSD are set and prepared according to the selected color space, and the color space can be classified into a color space for an output video image and a color space for an OSD.

Then, if there is an output request of a content image (i.e. RGB) from the data content browser, first a currently set color space is determined, and then it is determined whether a color space conversion at a bitmap level is necessary. In other words, a step of determining whether the set color space is, for example, RGB is performed (S203).

At a result of the above determining step, if the color space is RGB, the content image is processed for displaying on a display without a conversion process because the original content image is in an RGB color space. However, if the selected color space is YCbCr, the content image of an RGB color space is processed to convert the content image at a bitmap level, and the content image is converted into the content image of a YCbCr color space (S204).

Now, the conversion steps of the present invention, particularly the step 203 and 204 are described in more detail as follows.

In the case that the received data content with an RGB color coordinate system has a bitmap image of 8 bpp or less, a palette, which is used in an OSD color space, i.e., the RGB color coordinate system, should be replaced with a palette for the selected color space for output.

However, in the case that the received data content of an RGB color coordinate system has a bitmap image of 16 bpp or more, the color coordinate system of the bitmap image of the data content is converted into the color coordinate system of an output OSD.

While there are an RGB color coordinate system and an YCbCr color coordinate system as a color space for the output OSD, the received data content is made in an RGB color coordinate system as above. The original color can be desirably reproduced when the both color coordinate system of the received data content and the output OSD accord with each other. For instance, if the color space of the output OSD is an RGB color coordinate system, the bitmap image of the data content is displayed on the output OSD without an additional conversion process.

In contrast, if the color space of the output OSD is a YCbCr color coordinate system, the bitmap image of the data content should be converted for display.

A concrete process of converting a content image bitmap of 16 bpp in a single pixel unit (aRGB1:5:5:5 aYCbCr2:6:4:4) as follows.

```
/* extraction of a, R, G, B components at "pixel" (16 bit) */
a=(pixel & 0x8000)>>1; // alpha blending flag
r=(pixel & 0x7C00)>>7; // red
g=(pixel & 0x03E0)>>2; //green
b=(pixel & 0x001F)<<3; //blue
/* calculating Y, Cb, Cr values */
Y=((218*r+732*g+74*b)>>4) & 0x00003F00;
Cb=((512*b-118*r-394*g)/1024+128) & 0xF0;
Cr=((512*r-465*g-47*b)/1024+128)>>4;
/* result value */
result_pixel=(a/Y/Cb/Cr);
```

Then, the converted bitmap image of 16 bpp or more of an YCbCr color space or the content image without conversion is displayed on the display part 104 as an OSD to complete the above process (S205).

The color space conversion process (S204) of a bitmap image of the present invention is applied to an OSD device driver and is performed before the step of displaying the image on OSD as a final output step (S205).

However, the color space conversion step (S204) can be performed in a decoding step (S201) of analyzing the received data content in a browser, or can be performed when producing a decoded data content as an image in the case of associated graphic library leveled lower than the browser of step 202.

As described above, the method and apparatus for converting a color space of an OSD according to the present invention allows to realize a desired color of a digital broadcasting image by converting a color space of received data content into a color space of output OSD on a screen.

More specifically, the present invention allows to reproduce desired colors of an input image when displaying the image on OSD of 16 bpp or more as a display of digital broadcasting data content by a conversion process at a bitmap level for the image according to a color space of an output image.

In addition, the present invention provides a method through a software for converting an image of input data content according to a color space of output OSD of 16 bpp or more as a display for digital broadcasting data content without a separate hardware.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for converting a color space of an OSD for displaying received image data the apparatus comprising:
    a browser for analyzing information on the received image data and determining a mode of color space of the received image data from a plurality of modes of color space based on the analyzed information;
    a selective switch for selecting one of a plurality of modes of the color space of an output OSD according to a selection by a user;
    a converter for checking the mode of the color space of the output OSD selected by the user, setting a property of the color space of the output OSD according to the selected mode, comparing the determined mode of color space of the received image data to the selected mode of the color space of the output OSD, and converting a bitmap image of the received image data to accord with the selected mode of the color space of the output OSD if the determined mode does not match the selected mode; and
    a display part for displaying the set and converted color space on the OSD.

2. The apparatus according to claim 1, wherein the selective switch is a color space mode selection switch.

3. The method according to claim 1, wherein the converter is further adapted to display the received image data on the OSD without converting the bitmap image if the determined mode data matches the selected mode.

4. The method according to claim 1, wherein the converter is further adapted to convert the bitmap of the received image data into a bitmap of the selected mode of the color space of the OSD if the bitmap of the received image data is an RGB bitmap of one of greater than and equal to 16 bpp.

5. The method according to claim 1, wherein the analyzing function of the browser and the comparing and converting functions of the converter are combined.

6. The method according to claim 1, further comprising an associated graphic library level lower than the browser and wherein the converter is further adapted to perform the comparing and converting functions after the received image data has been applied to the graphics library level and decoded.

7. The method according to claim 1, wherein the converter is further adapted to replace a palette used in the output OSD with a palette for the selected mode of the color space of the OSD if the bitmap of the received image data is an RGB bitmap of one of equal to and less than 8 bpp.

8. The method according to claim 1, wherein the converter is further adapted to convert the bitmap of the received image data into a bitmap of the selected mode of the color space of the OSD if the OSD is one of greater than and equal to 16 bpp.

9. A method for converting a color space of an OSD for displaying received image data the method comprising:
    a) selecting one of a plurality of modes of the color space outputted on the OSD;
    b) setting a property of the color space of the OSD and a property of a color space of a video according to the selected mode of the color space of the OSD;
    c) determining a mode of color space of the received image data from a plurality of modes of color space and deciding whether or not to perform a color space conversion at a bitmap level according to the determined mode;
    d) converting a bitmap image of the received image data into a bitmap image of the selected mode of color space of the OSD if the determined mode does not match the selected mode; and
    e) displaying the converted bitmap image on the OSD.

10. The method according to claim 9, wherein the step (a) is performed by a user using a color space mode selection switch.

11. The method according to claim 9, wherein in the step (c), if the determined mode of the received image data matches the selected mode of the color space of the OSD, the bitmap image of the received image data is displayed on the OSD without converting the bitmap image.

12. The method according to claim 9, wherein in the step (d), if the bitmap of the received image data is an RGB bitmap of one of greater than and equal to 16 bpp, the bitmap of the received image data is converted into a bitmap of the selected mode of the color space of the OSD.

13. The method according to claim 9, wherein the step (d) is applied in advance during a decoding process in which the received image data is analyzed in a browser.

14. The method according to claim 9, wherein the step (d) is performed when the data content that has been applied to an associated graphic library level lower than a browser and decoded is produced as an image.

15. The method according to claim 9, wherein in the step (d), if the bitmap of the received image data is an RGB bitmap of one of equal to and less than 8 bpp, a palette used in the OSD color space is replaced with a palette for the selected mode of the color space of the OSD.

16. The method according to claim 9, wherein in the step (d), if the OSD is one of greater than and equal to 16 bpp, the bitmap of the received image data is converted into a bitmap of the selected mode of the color space of the OSD.

* * * * *